(12) United States Patent
Chen

(10) Patent No.: US 8,436,951 B2
(45) Date of Patent: May 7, 2013

(54) LCD CAR MONITOR FRAME STRUCTURE

(75) Inventor: Duke Chen, Hsi-Chih (TW)

(73) Assignee: Equus Inc., New Taipei (TW)

( * ) Notice: Subject to any disclaimer, the term of this patent is extended or adjusted under 35 U.S.C. 154(b) by 2186 days.

(21) Appl. No.: 10/978,446

(22) Filed: Nov. 2, 2004

(65) Prior Publication Data

US 2006/0092127 A1 May 4, 2006

(51) Int. Cl.
*H04N 5/64* (2006.01)
*A47H 1/10* (2006.01)

(52) U.S. Cl.
USPC .......................................... 348/837; 248/333

(58) Field of Classification Search .................. 348/837; 248/917, 919, 921–923, 317, 333
See application file for complete search history.

(56) References Cited

U.S. PATENT DOCUMENTS

| | | | | |
|---|---|---|---|---|
| 5,145,128 A * | 9/1992 | Umeda | ...................... | 244/118.5 |
| 5,751,548 A * | 5/1998 | Hall et al. | ................. | 361/679.41 |
| 5,775,762 A * | 7/1998 | Vitito | ........................... | 296/37.7 |
| 5,927,784 A * | 7/1999 | Vitito | ........................... | 296/37.7 |
| 6,246,449 B1 * | 6/2001 | Rosen | ........................... | 348/837 |
| 6,352,226 B1 * | 3/2002 | Gordon | ...................... | 248/125.2 |
| 6,412,848 B1 * | 7/2002 | Ceccanese et al. | .......... | 296/37.7 |
| 6,484,993 B2 * | 11/2002 | Huffman | ...................... | 248/323 |
| 6,522,368 B1 * | 2/2003 | Tuccinardi et al. | ........... | 348/837 |
| 6,655,646 B2 * | 12/2003 | Johnson | ..................... | 248/285.1 |
| 6,659,777 B1 * | 12/2003 | Rondeau | ........................ | 434/416 |
| 6,663,155 B1 * | 12/2003 | Malone et al. | ............... | 296/37.8 |
| 6,695,376 B1 * | 2/2004 | Hirano | .......................... | 296/37.7 |
| 6,702,238 B1 * | 3/2004 | Wang | .......................... | 248/125.8 |
| 6,708,940 B2 * | 3/2004 | Ligertwood | ................... | 248/324 |
| 6,719,343 B2 * | 4/2004 | Emerling et al. | .......... | 296/24.34 |
| 6,752,444 B2 * | 6/2004 | Kitano et al. | ............... | 296/184.1 |
| 6,795,757 B2 * | 9/2004 | Sadahiro | ......................... | 701/29 |
| 6,979,038 B1 * | 12/2005 | Cho et al. | ...................... | 296/37.7 |
| 6,992,883 B2 * | 1/2006 | Oh | .......................... | 361/679.05 |
| 7,084,932 B1 * | 8/2006 | Mathias et al. | ............... | 348/837 |
| 7,090,186 B2 * | 8/2006 | Quinno et al. | ................ | 248/324 |
| 7,176,987 B2 * | 2/2007 | Liu | .............................. | 348/838 |
| 7,212,398 B2 * | 5/2007 | Peng | ......................... | 361/679.21 |
| 7,333,009 B2 * | 2/2008 | Schedivy | ....................... | 340/461 |
| D563,700 S * | 3/2008 | Walters et al. | ................. | D6/513 |
| 7,379,125 B2 * | 5/2008 | Chang | ........................... | 348/837 |
| 7,500,705 B2 * | 3/2009 | Vitito | ............................ | 296/37.8 |
| 2004/0026947 A1 * | 2/2004 | Kitano et al. | ............... | 296/24.34 |
| 2005/0122670 A1 * | 6/2005 | Oh | ................................. | 361/681 |
| 2005/0189461 A1 * | 9/2005 | Peng | ............................. | 248/317 |
| 2006/0055833 A1 * | 3/2006 | Lee et al. | ....................... | 348/837 |

* cited by examiner

*Primary Examiner* — Brian Yenke

(74) *Attorney, Agent, or Firm* — Chun-Ming Shih; HDLS IPR Services

(57) ABSTRACT

A liquid crystal display (LCD) car monitor frame structure without blocking a driver's rear vision includes a roof mount fixed to a car ceiling, a LCD monitor, and at least one connecting member connecting the LCD monitor to the roof mount. An unobstructed space is formed between the roof mount and the LCD monitor when the LCD monitor is rotated out and pulled down to a pre-determined position for utilization by passengers. The unobstructed space accords with the view angle of the rearview mirror of a car. The rear vision of a driver will not be blocked while rear seat passengers watch the LCD monitor.

7 Claims, 15 Drawing Sheets

LCD CAR MONITOR FRAME STRUCTURE

BACKGROUND OF THE INVENTION

The present invention relates in general to a frame structure for a liquid crystal display (LCD) car monitor, and more particularly, to a LCD car monitor frame structure without blocking a driver's rear vision that provides the driver with an unobstructed space between the LCD monitor and the car ceiling while the LCD monitor is being utilized. The unobstructed space is large enough so that the rear vision of the driver will not be blocked while the rear seat passengers watch the LCD monitor. The unobstructed space, thereby, ensures that the driver has a sufficient view for safe driving.

Accompanying the rapid progress of the electrical industry, the LCD technology is well developed today. The LCD monitor has become a popular and commonplace consumer electronic product. The LCD monitor has many applications. The LCD monitor has been utilized in notebook computers, televisions, and automobiles as well. Certainly, many car manufacturers install a LCD into their new cars either as standard equipment or as an added incentive to attract more consumers. There are many different locations in a car's interior that can be used to mount a LCD monitor. As shown in FIG. 1, the front of the car ceiling just above the rearview mirror is frequently chosen by consumers for installation of the LCD monitor. This disposition, nonetheless, distracts a driver from the road condition, and is very likely to cause a serious accident. Consequently, many car manufacturers mount their LCD monitor at the center of the car ceiling, aligned with the chair backs of the front seats, as shown in FIG. 2. The frame structure of the LCD car monitor comprises a roof mount 11 that is fixed to the car ceiling for attaching a LCD monitor 12. The LCD monitor 12 and the roof mount 11 are pivotally connected so that the monitor 12 can be rotated downward from its normal storage position. This downward rotation enables the rear seats passengers to watch the LCD monitor. The LCD monitor 12 is either manually or automatically rotated about 90 to 120 degrees toward a pre-determined position suitable for rear seat passengers to watch it. The LCD monitor can, therefore, only be watched by the rear seat passengers, which remedies the distraction of the driver. However, because the LCD monitor is installed between the rearview mirror and the rear window, the LCD monitor hinders the rear vision of the driver. Since the LCD monitor blocks the rear vision, the driver can only utilize the two outside mirrors, which do not remedy the blind spot at the rear of the car. It is, consequently, very dangerous to use the LCD monitor during travel, even though the driver attempts to focus his attention on the road condition.

BRIEF SUMMARY OF THE INVENTION

The present invention provides a LCD car monitor frame structure without blocking a driver's rear vision that provides a driver with an unobstructed space between the LCD monitor and the car ceiling while the LCD monitor is being utilized. The unobstructed space is large enough so that the rear vision of the driver will not be blocked while the rear seat passengers watch the LCD monitor.

One primary objective of the present invention is to remedy the drawback of the conventional frame structure of LCD car monitor that blocks the rear vision of a driver while rear seat passengers watch the LCD monitor.

The primary objective and others objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

These as well as other features of the present invention will become more apparent upon reference to the drawings therein.

DETAILED DESCRIPTION OF THE INVENTION

Figure 1:
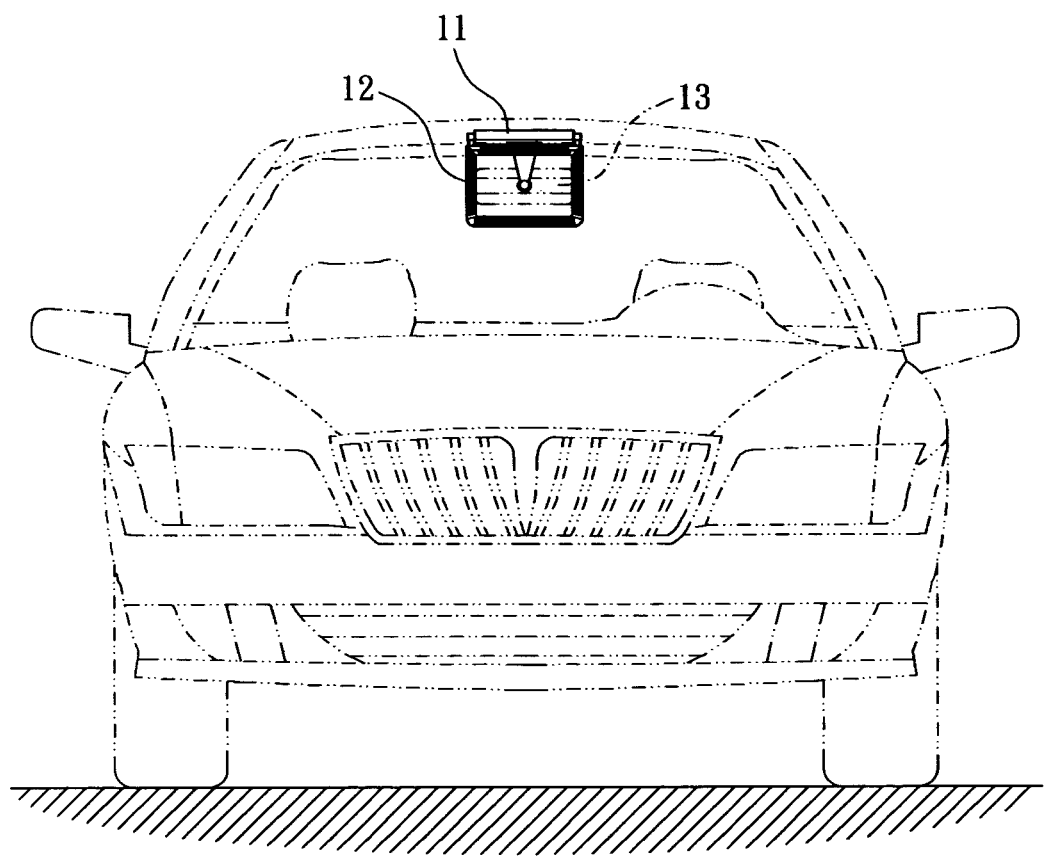
FIG. 1 is a front view of a car with a liquid crystal display (LCD) car monitor installed at the front of the car ceiling, illustrating one conventional art.
Figure 2:
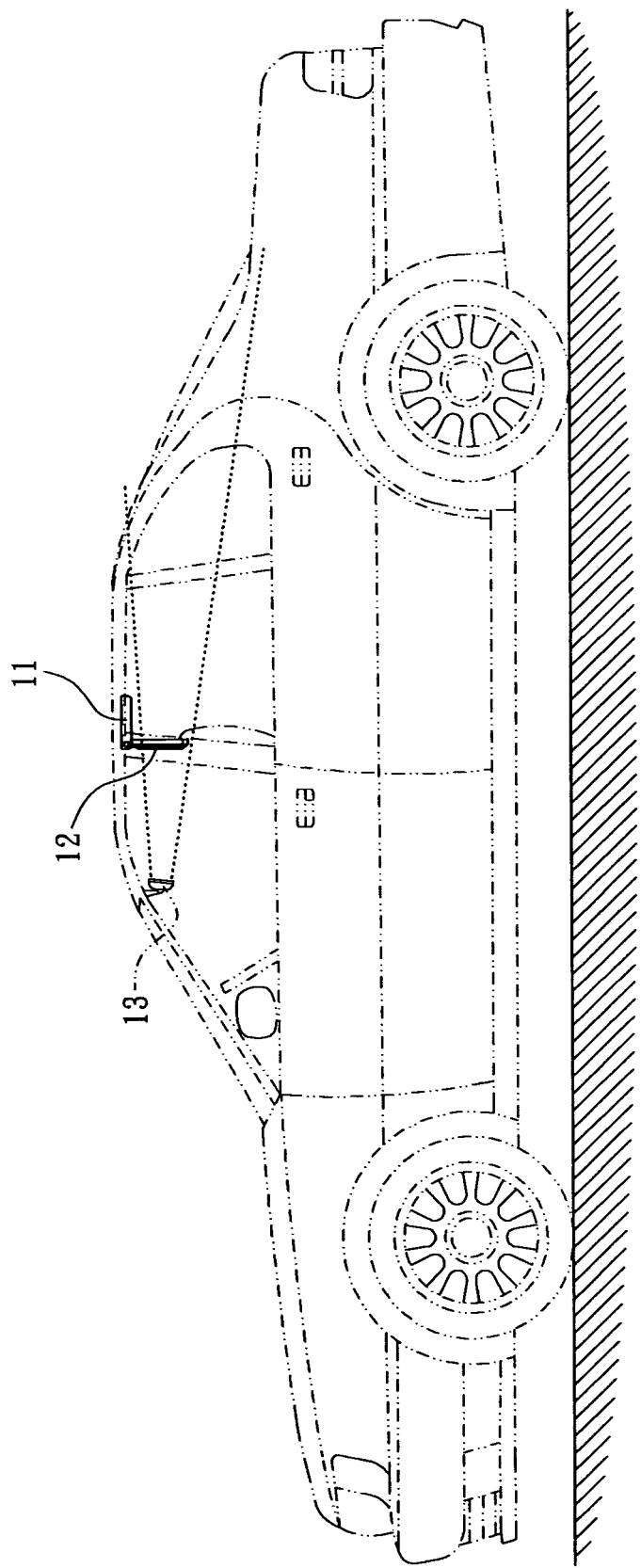
FIG. 2 is a side view of a car with a LCD car monitor installed at the center of the car ceiling, illustrating another conventional art.
Figure 3:
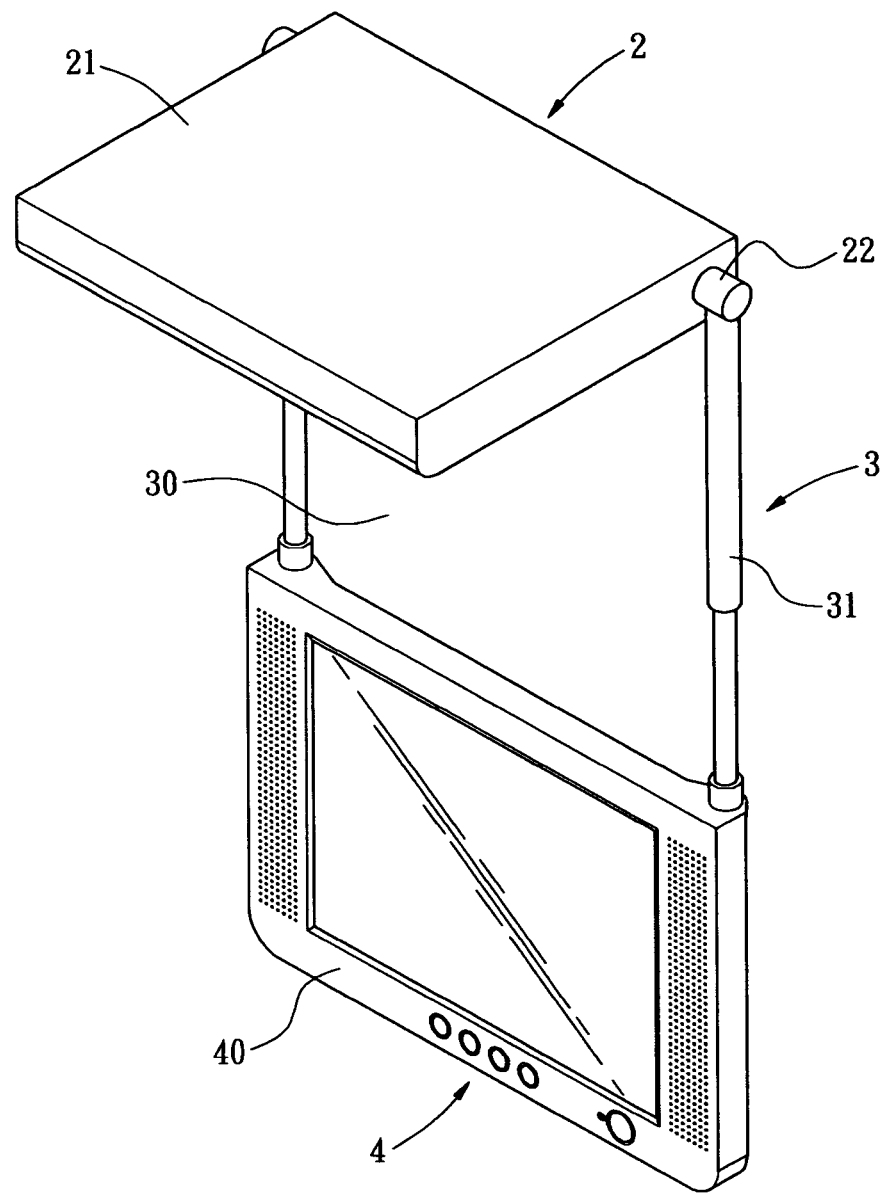
FIG. 3 is a perspective view of a LCD car monitor frame structure without blocking a driver's rear vision of a first embodiment in accordance with the present invention.

Reference will now be made in detail to the preferred embodiments of the present invention, examples of which are illustrated in the accompanying drawings. Wherever possible, the same reference numbers are used in the drawings and the description to refer to the same or like parts.

Referring to FIG. 3 through FIG. 8, a liquid crystal display (LCD) car monitor frame structure without blocking a driver's rear vision of a first embodiment in accordance with the present invention comprises a roof mount 2, a LCD monitor 4, and two connecting member 3.

The roof mount 2 includes a flat plane 21 that is secured to a car ceiling. At one side of the roof mount 2, a pivot axle 22, which is connected to one end of the connecting member 3, is installed to enable the connecting member 3 to rotate around it.

The LCD monitor 4 comprises a monitor housing 40. The top of the monitor housing 40 is secured to the other end of the connecting member 3. The LCD monitor 4 is normally stored on the car ceiling ahead of the roof mount 2.

Figure 4:
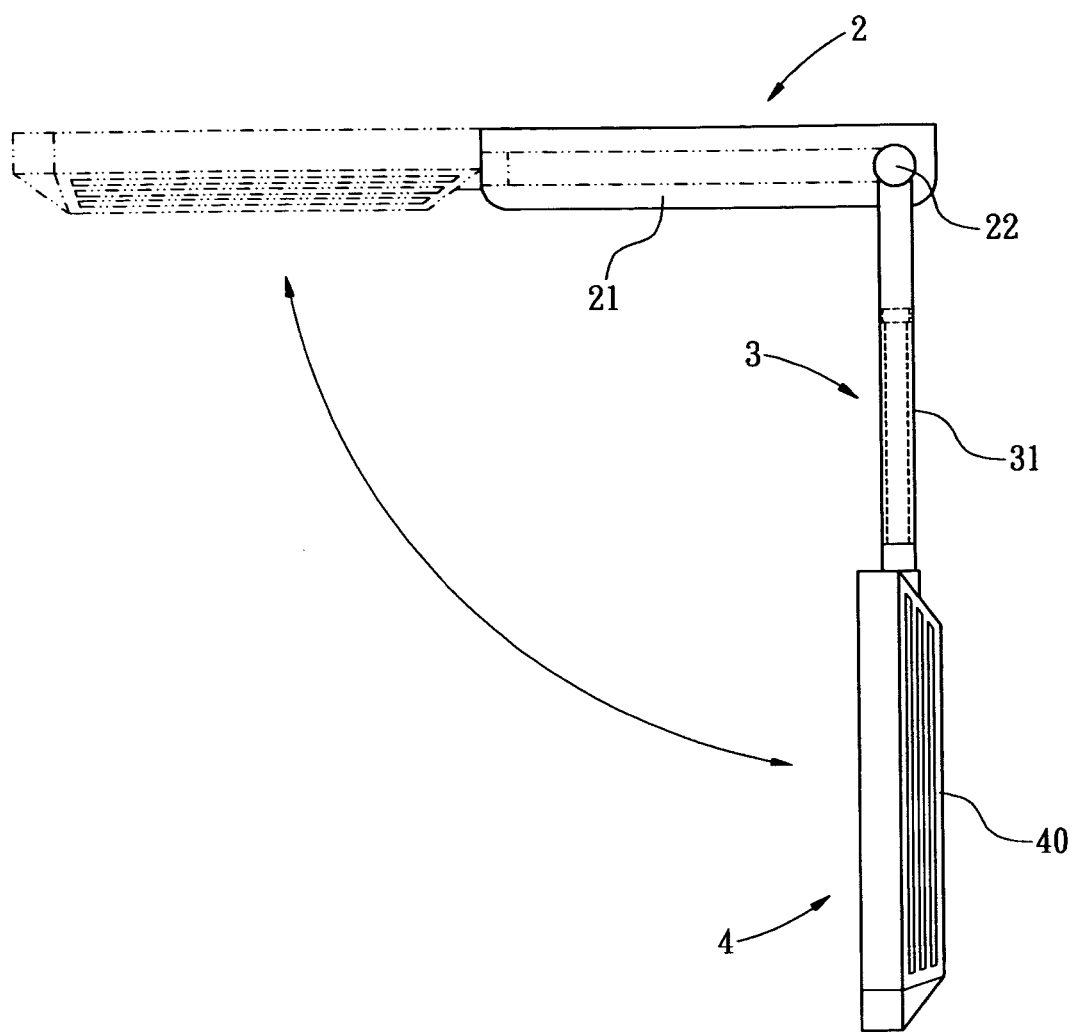
FIG. 4 is a side view of the LCD car monitor frame structure of the first embodiment, showing a condition wherein the LCD monitor is rotated from its stored position to a pre-determined position.
Figure 5:
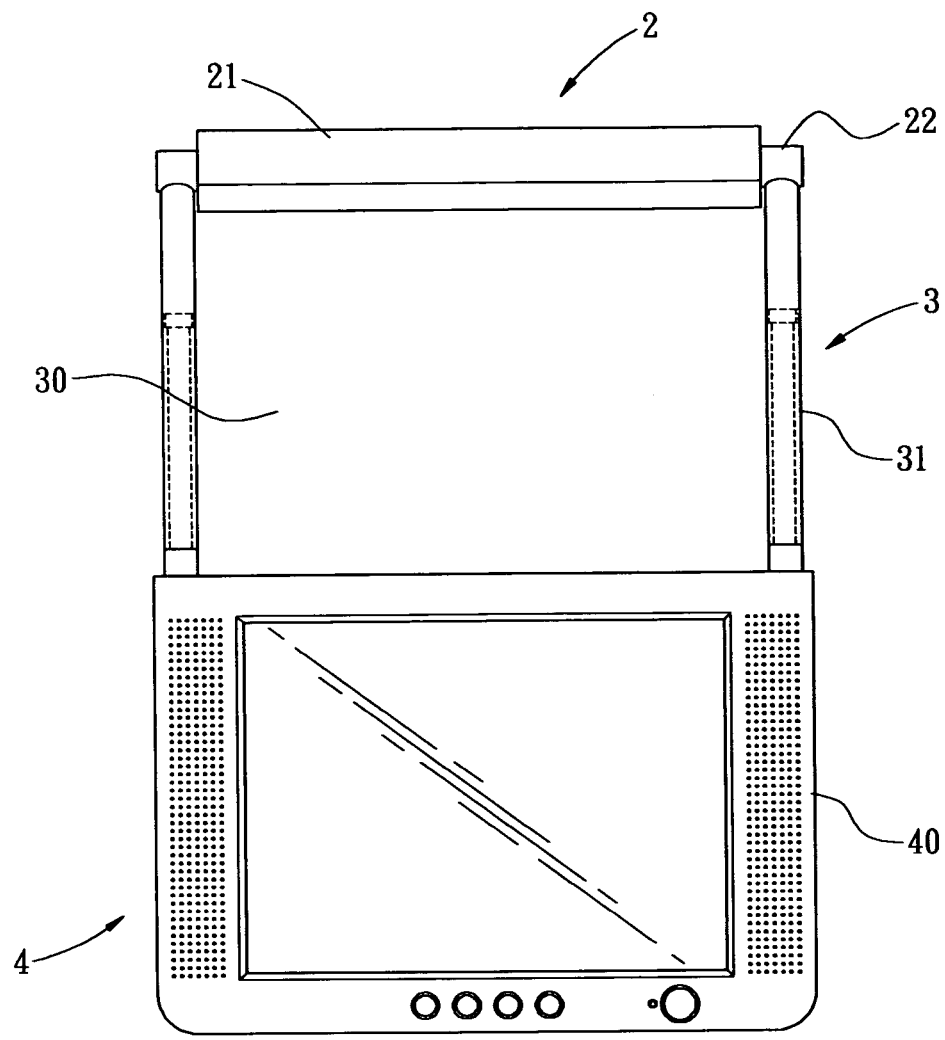
FIG. 5 is a front view of the LCD car monitor frame structure of the first embodiment, showing a condition wherein the LCD monitor is at the pre-determined position.
Figure 6:
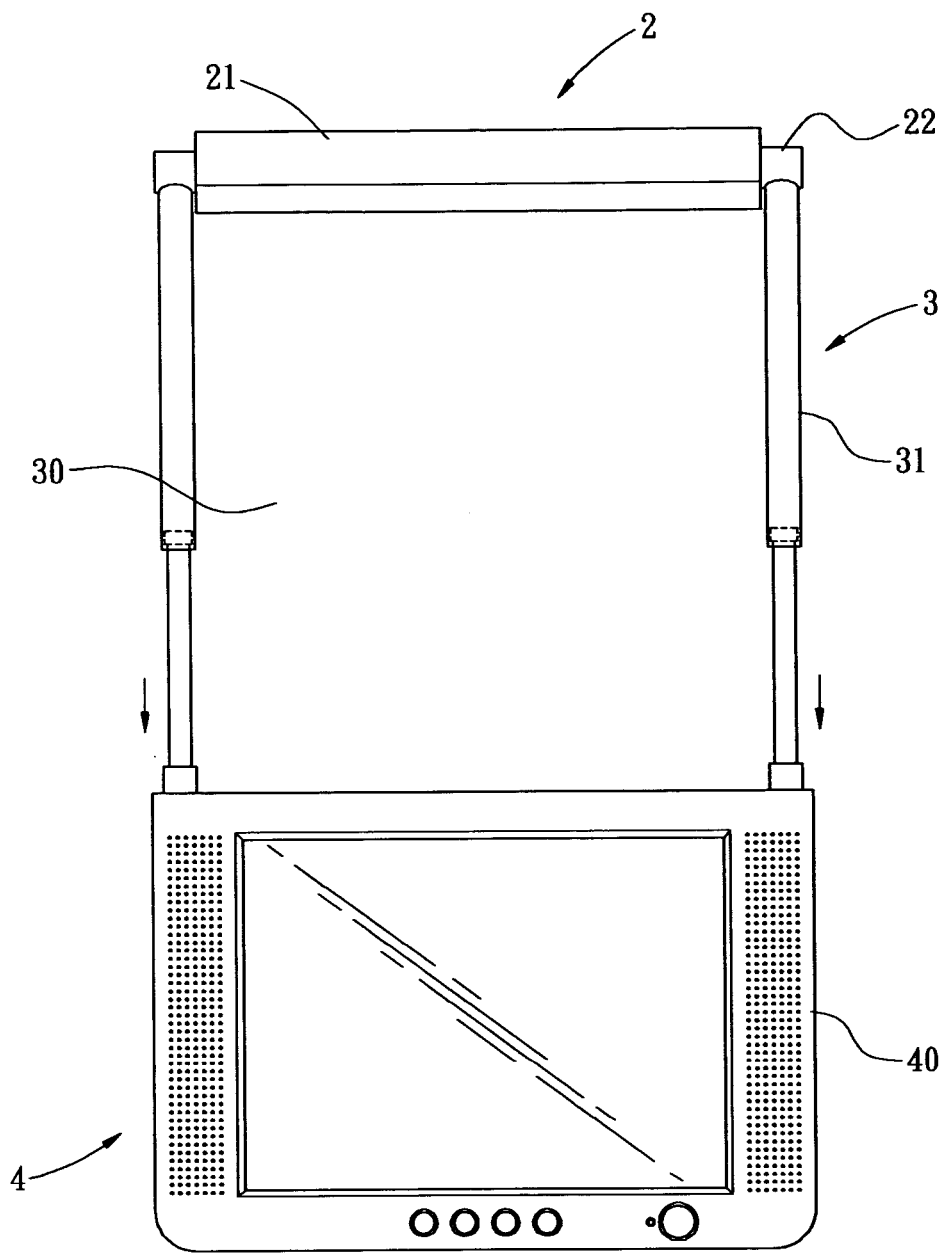
FIG. 6 is a front view of the LCD car monitor frame structure of the first embodiment, showing a condition wherein the LCD monitor is further lowered down.
Figure 7:
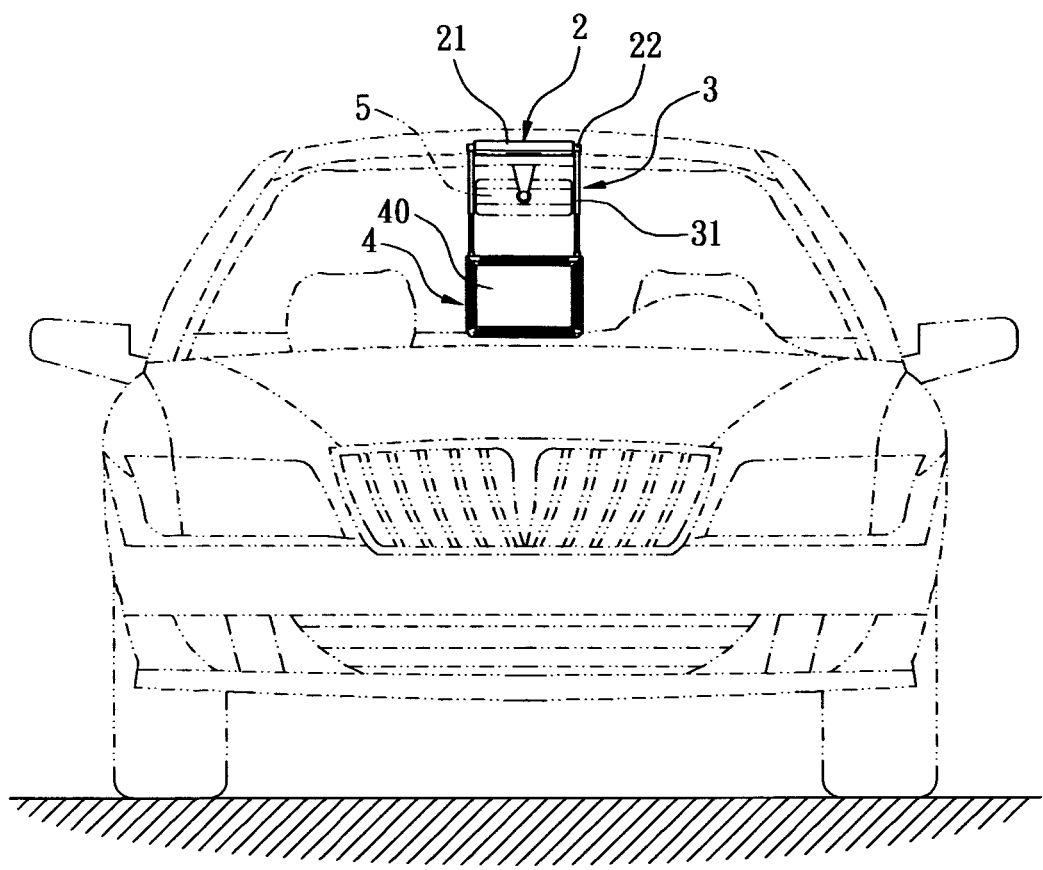
FIG. 7 is a front view of a car with the LCD car monitor frame structure of the first embodiment installed, showing an unobstructed space formed between the roof mount and the LCD monitor.
Figure 8:
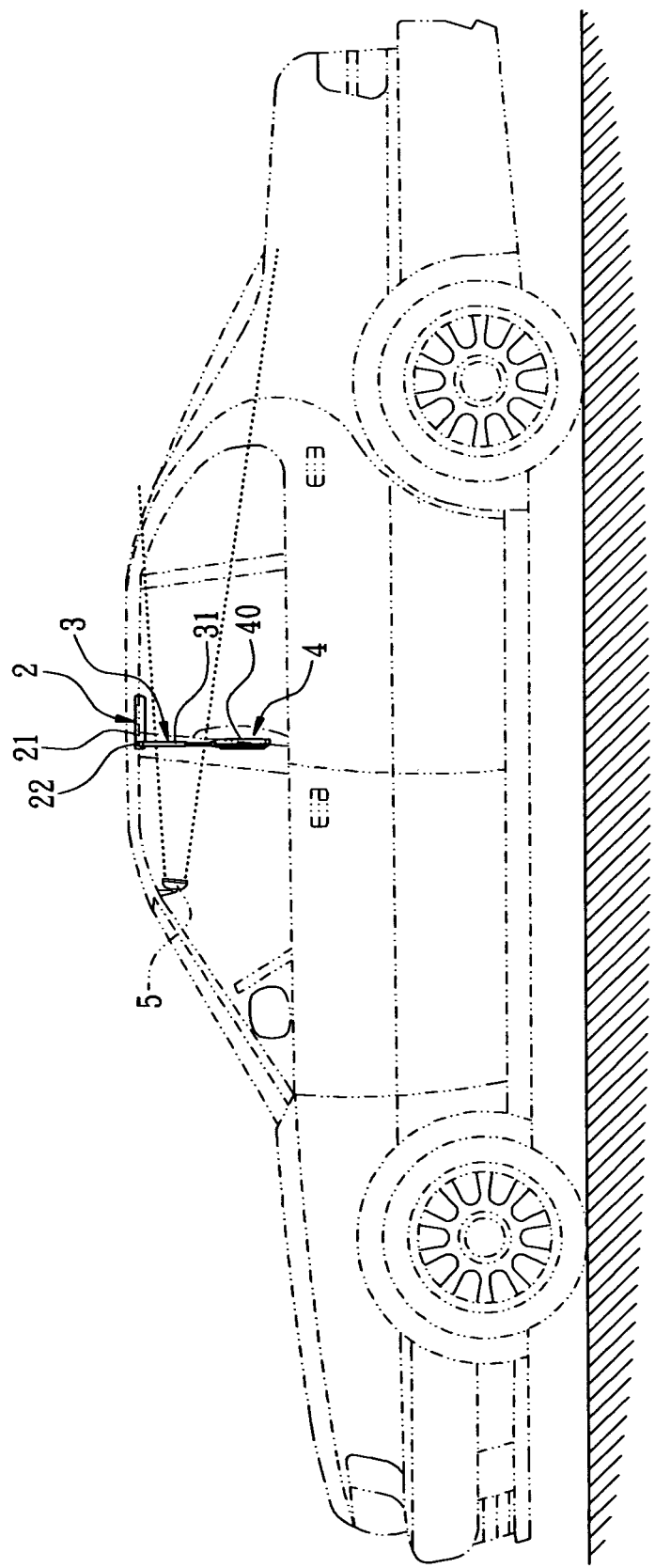
FIG. 8 is a side view of the car with the LCD car monitor frame structure of the first embodiment installed, showing a condition wherein the unobstructed space accords with the view angle of the rearview mirror of the car, and whereby the line of sight of a driver will not be blocked while rear seat passengers watch the LCD monitor.

The connecting member 3 connects the LCD car monitor 4 to the roof mount 2. The full length of the connecting member 3 is longer than the length of the roof mount 2. The LCD monitor 4 is thereby able to be stored on the car ceiling ahead of the roof mount 2. The connecting member 3 is either a fixed length connecting rod or a telescoping connecting rod 31. The present invention prefers to use a telescoping connecting rod 31. As stated above, one end of the connecting rod 31 connects to the pivot axle 22 of the roof mount 2. The other end of the connecting rod 31 connects to the LCD car monitor 4. Consequently, the LCD monitor 4 can be rotated automatically or manually out from its stored position to a pre-determined position, as shown in FIG. 4 and FIG. 5. The telescoping connecting rod 31 enables the LCD monitor 4 to further lower its position, as shown in FIG. 6. An unobstructed space 30 is, thereby, formed between the roof mount 2 and the LCD monitor 4, as shown in FIG. 7. The length of the unobstructed space 30 is equal to the length of the connecting rod 31. Because the unobstructed space 30 accords with the view angle of the rearview mirror of a car, the line of sight of a driver will not be blocked while rear seat passengers watch the LCD monitor 4, as shown in FIG. 8.

Figure 9:
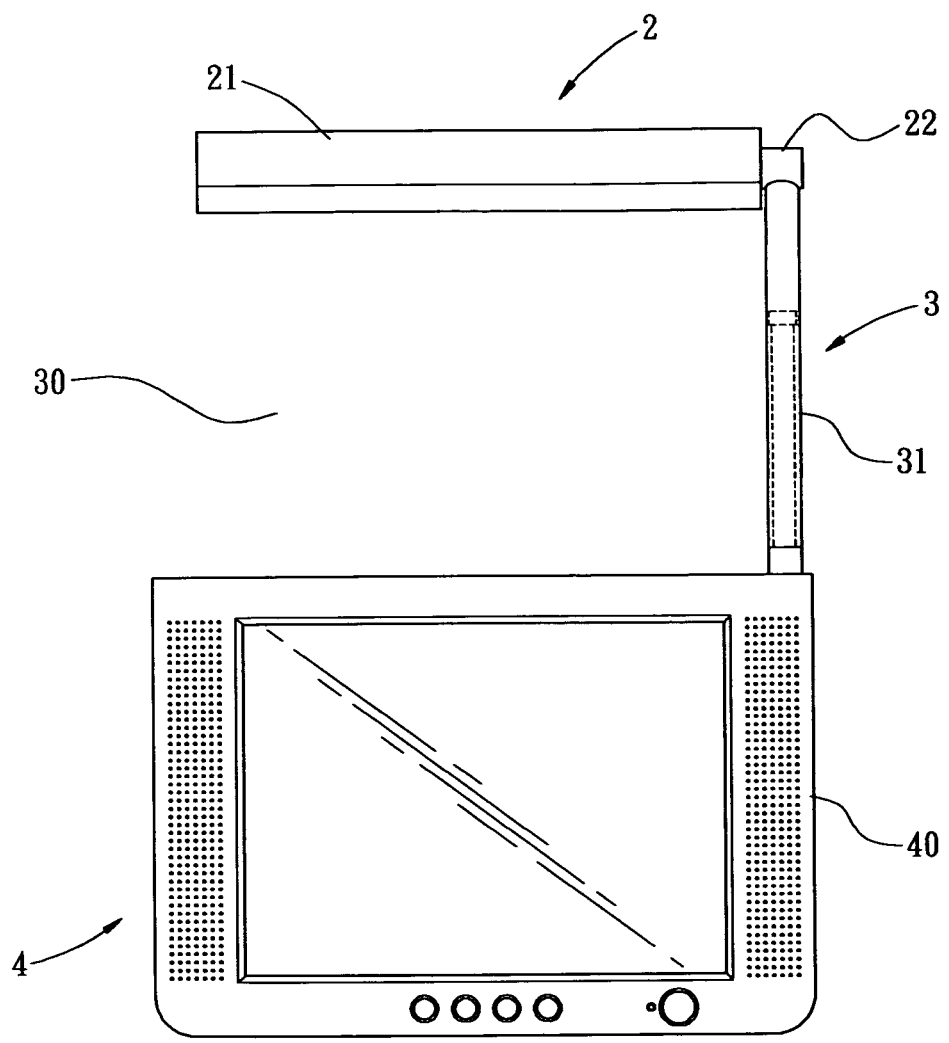
FIG. 9 is a front view of a LCD car monitor frame structure without blocking a driver's rear vision of a second embodiment in accordance with the present invention, showing a condition wherein the LCD monitor is at the pre-determined position.
Figure 10:
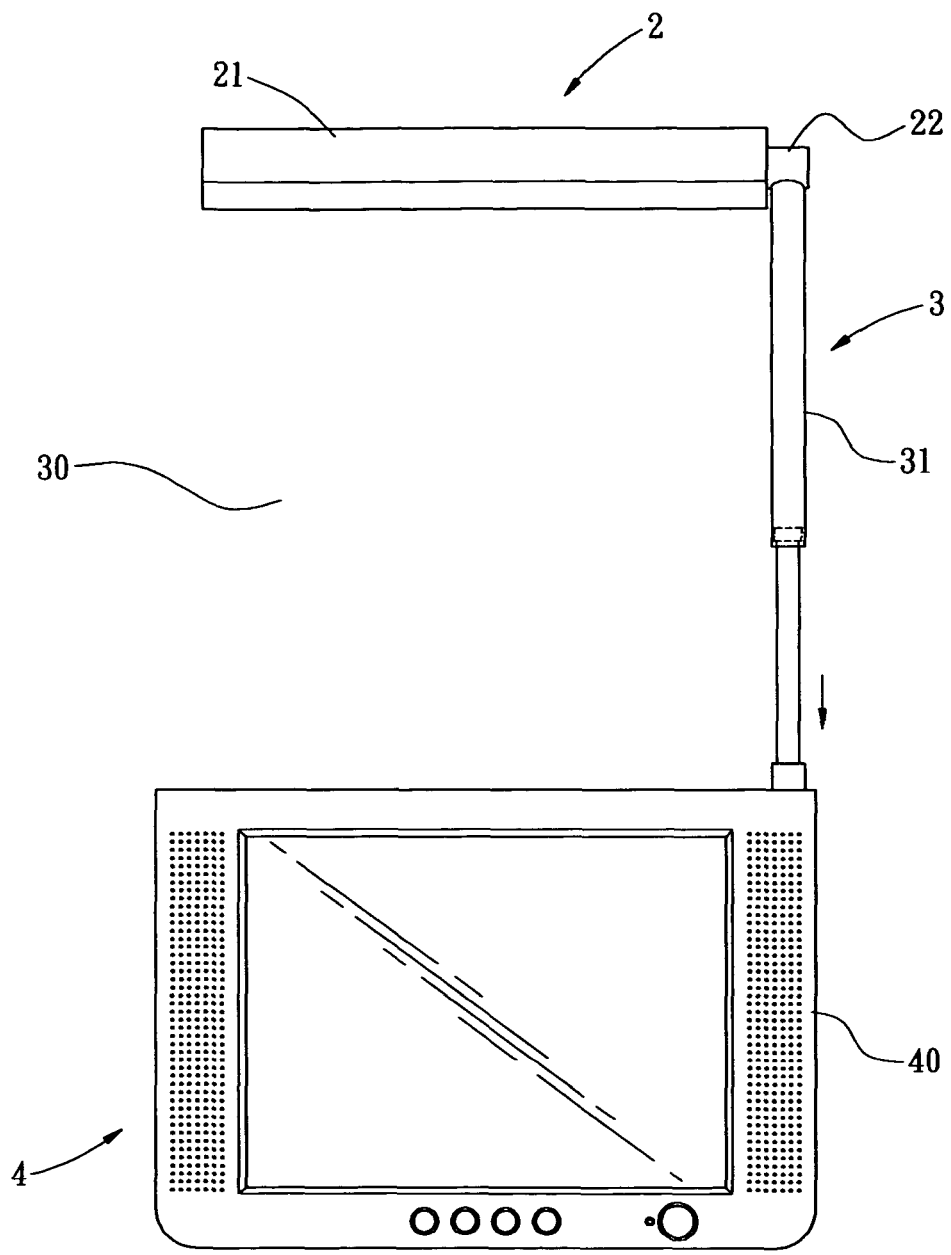
FIG. 10 is a front view of the LCD car monitor frame structure of the second embodiment, showing a condition wherein the LCD monitor is further lowered down.
Figure 11:
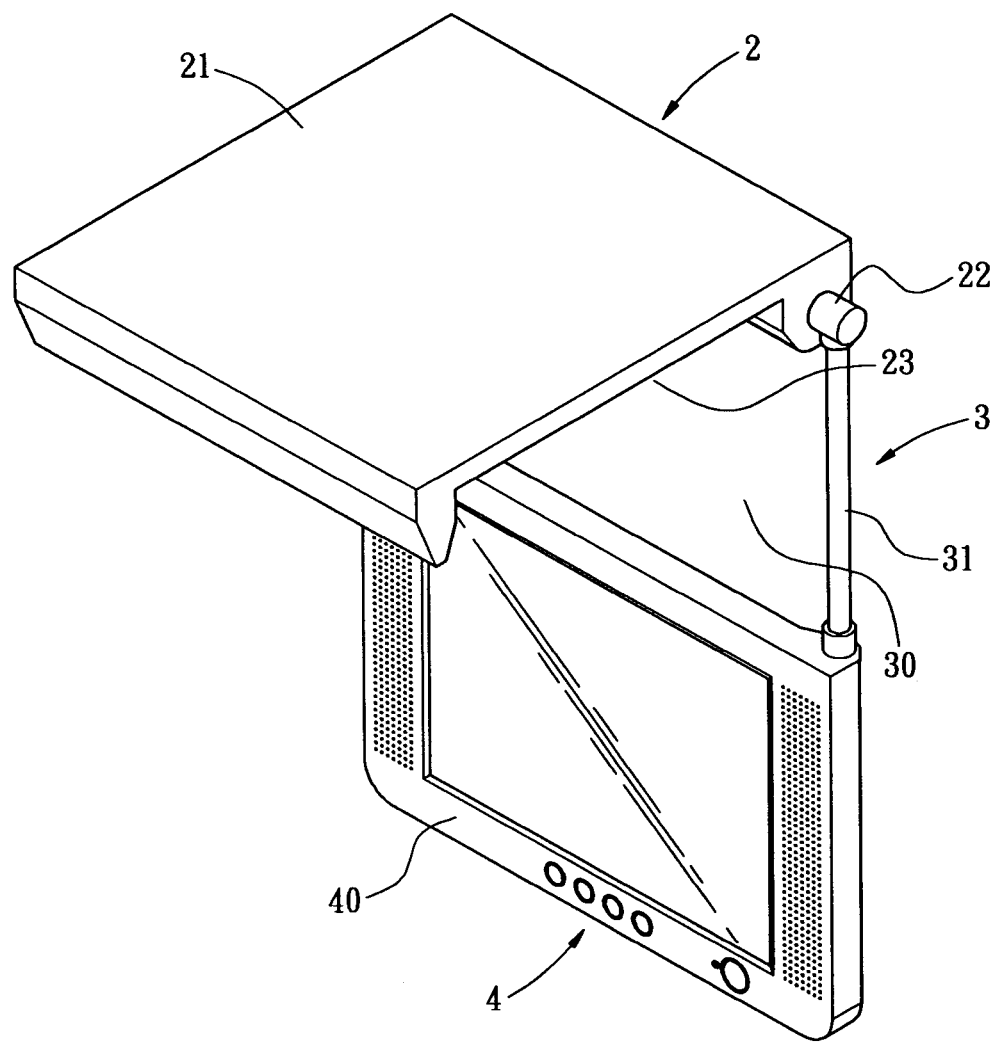
FIG. 11 is a perspective view of a LCD car monitor frame structure without blocking a driver's rear vision of a third embodiment in accordance with the present invention.

Referring to FIG. 9 and FIG. 10, a LCD car monitor flame structure without blocking a driver's rear vision of a second embodiment in accordance with the present invention is shown. The LCD car monitor frame structure comprises a roof mount 2, a LCD monitor 4, and a single connecting member 3. The single connecting member 3 is either a fixed length connecting rod or a telescoping connecting rod 31. The single connecting member 3 can be secured either at the middle or at one side of the roof mount 2.

Figure 12:
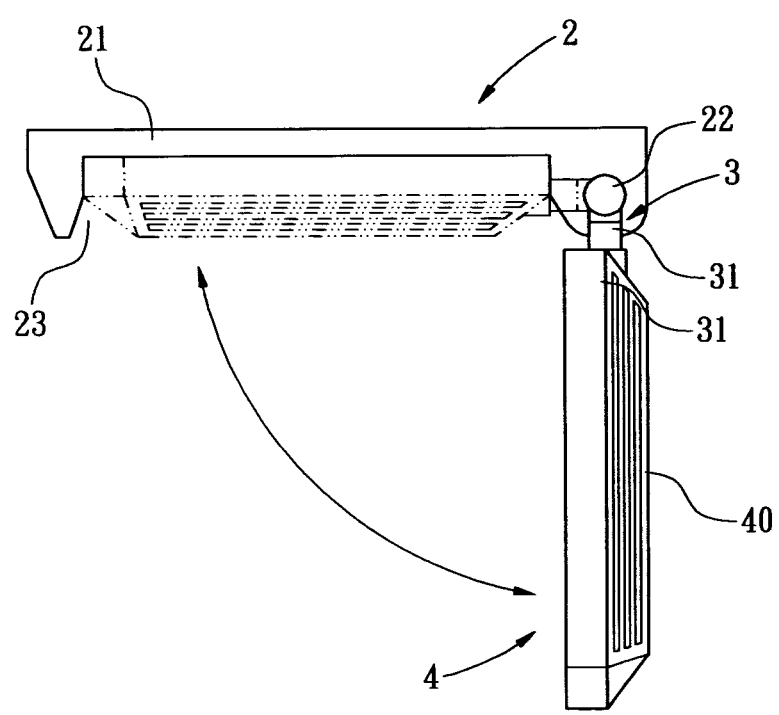
FIG. 12 is a side view of the LCD car monitor frame structure of the third embodiment, showing a condition wherein the LCD monitor is rotated from its stored position to a pre-determined position.
Figure 13:
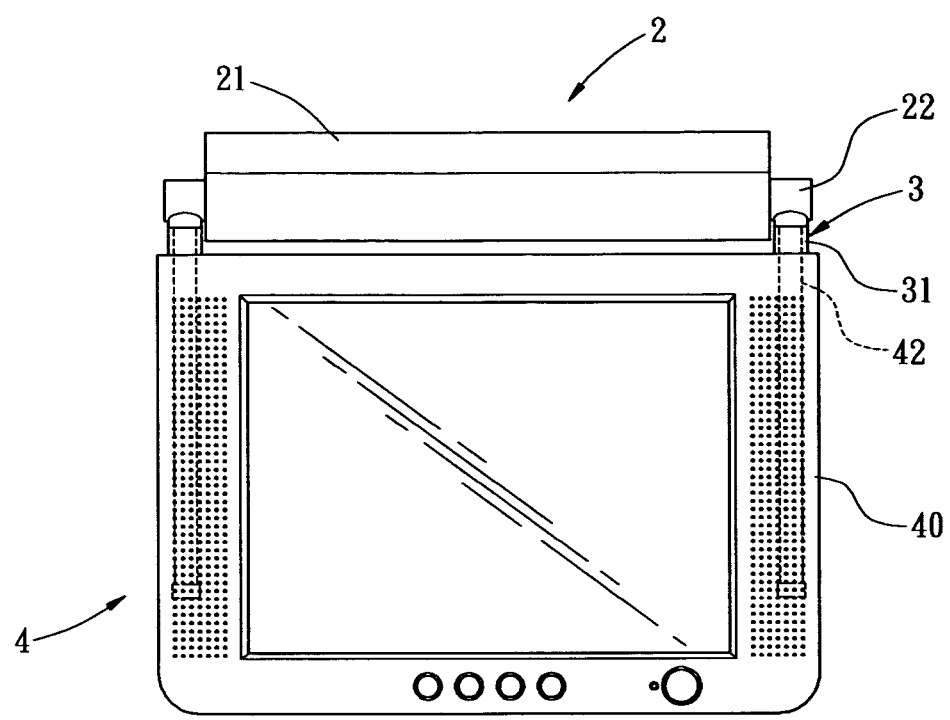
FIG. 13 is a front view of the LCD car monitor frame structure of the third embodiment, showing a condition wherein the LCD monitor is at the pre-determined position.
Figure 14:
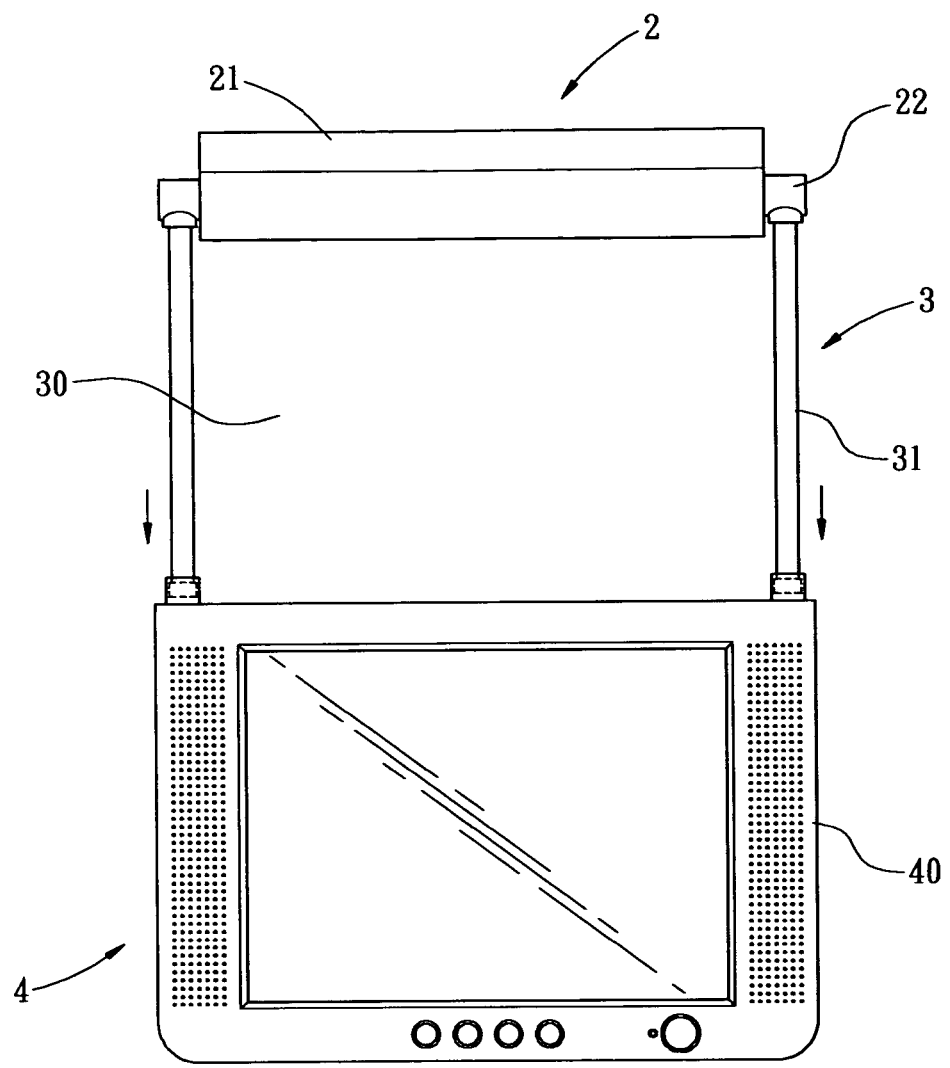
FIG. 14 is a front view of the LCD car monitor frame structure of the third embodiment, showing a condition wherein the LCD monitor is further lowered down.

Referring to FIG. 11 through FIG. 14, a LCD car monitor frame structure without blocking a driver's rear vision of a third embodiment in accordance with the present invention is shown. The LCD car monitor frame structure comprises a roof mount 2 with a receptive space 23, a LCD monitor 4 with at least one elongate hole 42, and two connecting member 3. The roof mount 2 includes a flat plane 21, a pivot axle 22, and a receptive space 23. The flat plane 21 is secured to the car ceiling. The pivot axle 22 is connected to one end of the connecting member 3. The receptive space 23 is able to store the LCD monitor 4. The other end of the connecting member 3 is movably installed inside the elongate hole 42 of the LCD monitor 4. The connecting member 3 is either a fixed length connecting rod 31 or a telescoping connecting rod. The LCD monitor 4 can be rotated automatically or manually out from its stored position to a predetermined position, as shown in FIG. 12 and FIG. 13. Because the connecting rod 31 is movably installed inside the elongate hole 42 of the LCD monitor 4, the LCD monitor 4 is able to lower its position, as shown in FIG. 14. An unobstructed space 30 is, thereby, formed between the roof mount 2 and the LCD monitor 4, as shown in FIG. 14. The length of the unobstructed space 30 is equal to the length of the connecting rod 31. Because the unobstructed space 30 accords with the view angle of the rearview mirror of a car, the line of sight of a driver will not be blocked while rear seat passengers watch the LCD monitor 4.

Figure 15:
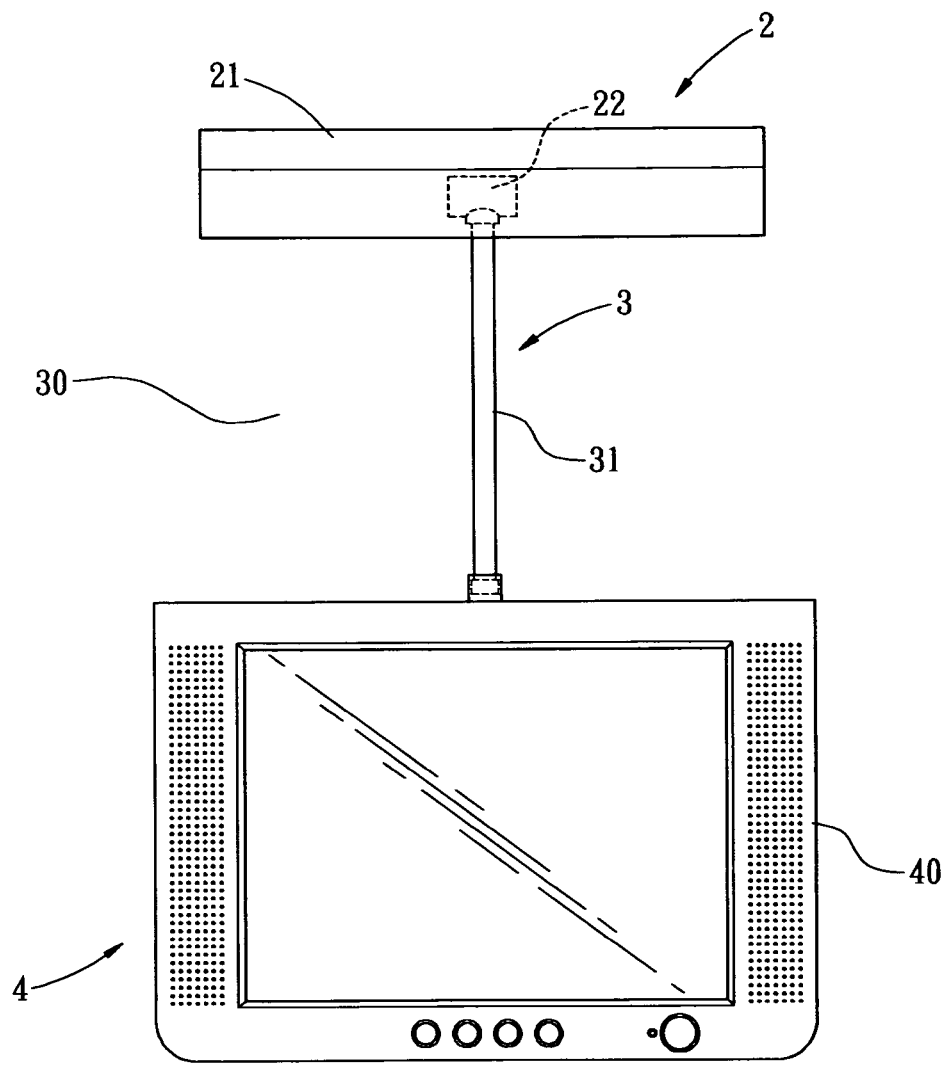
FIG. 15 is a front view of a LCD car monitor frame structure without blocking a driver's rear vision of a fourth embodiment in accordance with the present invention.

Referring to FIG. 15, a LCD car monitor frame structure without blocking a driver's rear vision of a fourth embodiment in accordance with the present invention is shown. The LCD car monitor frame structure comprises a roof mount 2 with a receptive space 23, a LCD monitor 4 with a single elongate hole 42, and a single connecting member 3. The single connecting member 3 can be secured either at the middle or at one side of the roof mount 2.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A liquid crystal display (LCD) car monitor frame structure without blocking a driver's rear vision, comprising:
    a LCD monitor;
    a roof mount that is fixed to a car ceiling; and
    two telescoping connecting members, each with one end pivotally connected to the roof mount and the other end fixedly connected to the LCD monitor, the length of each telescoping connecting member at a retracting status being long enough to have the LCD monitor rotated with respect to the roof mount so as to be stowed on the car ceiling ahead of the roof mount,
    whereby an unobstructed space is formed between the roof mount and the LCD monitor when the LCD monitor is rotated out and moved to a pre-determined position and is capable of further being lowered as the telescoping connecting members at an extending status for utilization by a driver, corresponding with the view angle of a rearview mirror, and the length of the unobstructed space is equal to the length of the telescoping connecting member at the retracting status or the extending status.

2. The LCD car monitor frame structure without blocking a driver's rear vision of claim 1, wherein the telescoping connecting member is a telescoping connecting rod.

3. The LCD car monitor frame structure without blocking a driver's rear vision of claim 1, wherein the telescoping connecting members are respectively secured at two sides of the roof mount.

4. The LCD car monitor frame structure without blocking a driver's rear vision of claim 1, wherein the roof mount has a pivot axle that is able to pivotally connect to one end of the telescoping connecting member.

5. A liquid crystal display (LCD) car monitor frame structure without blocking a driver's rear vision, comprising:
    a LCD monitor having two elongate holes;
    a roof mount fixed to a car ceiling, which includes a receptive space; and two connecting members, each with one end pivotally connected to the roof mount and the other end slidably installed inside one of the two elongate holes so that the LCD monitor can be rotated with respect to the roof mount to be stowed in the receptive space as the connecting members being located in the elongated holes respectively, whereby an unobstructed space is formed between the roof mount and the LCD monitor when the LCD monitor is rotated out and pulled down to a pre-determined position for utilization by a driver, corresponding with the view angle of a rearview mirror, and the length of the unobstructed space is equal to the length of the connecting member.

6. The LCD car monitor frame structure without blocking a driver's rear vision of claim 5, wherein the connecting members are respectively secured at two sides of the roof mount.

7. The LCD car monitor frame structure without blocking a driver's rear vision of claim 5, wherein the roof mount has a pivot axle that is able to pivotally connect to one end of the connecting member.

* * * * *